United States Patent
Lu

(10) Patent No.: US 11,138,125 B2
(45) Date of Patent: Oct. 5, 2021

(54) HYBRID CACHE MEMORY AND METHOD FOR REDUCING LATENCY IN THE SAME

(71) Applicant: Taiwan Semiconductor Manufacturing Company Limited, Hsinchu (TW)

(72) Inventor: Shih-Lien Linus Lu, Hsinchu (TW)

(73) Assignee: Taiwan Semiconductor Manufacturing Company Limited, Hsinchu (TW)

(*) Notice: Subject to any disclaimer, the term of this patent is extended or adjusted under 35 U.S.C. 154(b) by 61 days.

(21) Appl. No.: 15/701,575

(22) Filed: Sep. 12, 2017

(65) Prior Publication Data

US 2019/0026230 A1    Jan. 24, 2019

Related U.S. Application Data

(60) Provisional application No. 62/535,415, filed on Jul. 21, 2017.

(51) Int. Cl.
| G06F 12/00 | (2006.01) |
| G06F 12/0895 | (2016.01) |
| G06F 12/0804 | (2016.01) |
| G06F 12/0891 | (2016.01) |
| G06F 12/123 | (2016.01) |
| G06F 12/0864 | (2016.01) |

(52) U.S. Cl.
CPC ...... *G06F 12/0895* (2013.01); *G06F 12/0804* (2013.01); *G06F 12/0864* (2013.01); *G06F 12/0891* (2013.01); *G06F 12/123* (2013.01); *G06F 2212/1024* (2013.01); *G06F 2212/1044* (2013.01); *G06F 2212/225* (2013.01); *G06F 2212/502* (2013.01); *G06F 2212/601* (2013.01)

(58) Field of Classification Search
None
See application file for complete search history.

(56) References Cited

U.S. PATENT DOCUMENTS

| 5,900,012 A | * | 5/1999 | Tran | G06F 12/0844 711/120 |
| 6,209,062 B1 | * | 3/2001 | Boland | G06F 12/126 711/133 |
| 2014/0047184 A1 | * | 2/2014 | Kang | G06F 12/0893 711/122 |
| 2014/0052961 A1 | * | 2/2014 | Vorbach | G06F 9/3017 712/33 |

* cited by examiner

*Primary Examiner* — Craig S Goldschmidt
(74) *Attorney, Agent, or Firm* — Jones Day

(57) ABSTRACT

A method for controlling a cache comprising receiving a request for data and determining whether the requested data is present in a first portion of the cache, a second portion of cache, or not in the cache. If the requested data is not located in the MRU portion of the cache, moving the data into the first portion of the cache.

15 Claims, 4 Drawing Sheets

| Reference | hit/miss | WAY_0 (M) | WAY_1 (L) | WAY_2 | WAY_3 | WAY_4 | WAY_5 | WAY_6 | WAY_7 | notes |
|---|---|---|---|---|---|---|---|---|---|---|
| 1 A | miss with empty way | A | | | | | | | | MRU is empty no change to LRU* |
| 2 B | miss with empty way | B | A | | | | | | | Place new reference to MRU after Move MRU to LRU,LRU*++ |
| 3 C | miss with empty way | C | A | B | | | | | | Place new reference to MRU after Move MRU to LRU after LRU*++ |
| 4 D | miss with empty way | D | A | B | C | | | | | Place new reference to MRU after Move MRU to LRU after LRU*++ |
| 5 C | hit to non-LRU | C | A | B | D | | | | | swap ref/MRU ; no change to LRU* (when there is empty way there is no hit to LRU) |
| 6 A | hit to non-LRU | A | C | B | D | | | | | swap ref/MRU ; no change to LRU* (when there is empty way there is no hit to LRU) |
| 7 E | miss with empty way | E | C | B | D | A | | | | Place new reference to MRU after Move MRU to LRU,LRU*++ |
| 8 F | miss with empty way | F | C | B | D | A | E | | | Place new reference to MRU after Move MRU to LRU,LRU*++ |
| 9 G | miss with empty way | G | C | B | D | A | E | F | | Place new reference to MRU after Move MRU to LRU,LRU*++ |
| 10 E | hit to non-LRU | E | C | B | D | A | G | F | | swap ref/MRU ; no change to LRU* |
| 11 H | miss with empty way | H | C | B | D | A | G | F | E | Place new reference to MRU after Move MRU to LRU,LRU*++ (mod way) |
| 12 A | hit to non-LRU | A | C | B | D | H | G | F | E | swap ref/MRU ; no change to LRU* |
| 13 I | miss | I | A | B | D | H | G | F | E | Place new reference to MRU after Move MRU to LRU,write back LRU if dirty, LRU*++(B is the LRU it turns out) |
| 14 J | miss | J | A | I | D | H | G | F | E | Place new reference to MRU after Move MRU to LRU,write back LRU if dirty, LRU*++ ; D is the LRU! |
| 15 D | hit to LRU(=LRU) | D | A | I | J | H | G | F | E | swap ref/MRU ; LRU*++ |
| 16 A | hit to non-LRU | A | D | I | J | H | G | F | E | swap ref/MRU ; no change to LRU* |
| 17 B | miss | B | D | I | J | H | A | F | E | Place new reference to MRU after Move MRU to LRU,write back LRU if dirty, LRU*++(H is NOT the LRU, the LRU is F) |
| 18 I | hit to non-LRU | I | D | B | J | H | A | F | E | swap ref/MRU ; no change to LRU*, |
| 19 A | hit to non-LRU | A | D | B | J | I | H | F | E | swap ref/MRU ; no change to LRU*, |
| 20 G | hit to LRU(=LRU) | G | D | B | J | I | A | F | E | swap ref/MRU ; LRU*++ |

| Reference | hit/miss | M (WAY_0) | L (WAY_1) | WAY_2 | WAY_3 | notes |
|---|---|---|---|---|---|---|
| 1 A | miss with empty way | A | | | | MRU is empty no change to LRU |
| 2 B | miss with empty way | B | A | | | Place new reference to MRU after Move MRL to LRU,LRU*++ |
| 3 C | miss with empty way | C | A | B | | Place new reference to MRU after Move MRL to LRU,LRU*++ |
| 4 D | miss with empty way | D | A | B | C | Place new reference to MRU after Move MRL to LRU,LRU*++ |
| 5 C | hit to non-LRU | C | A | B | D | swap ref/MRU ; no change to LRU* |
| 6 A | hit to LRU(=LRU) | A | C | B | D | swap ref/MRU ; LRU*++ |
| 7 E | miss | E | C | A | D | Place new reference to MRL after Move MRL to LRU,write back LRU if dirty, LRU*++(D is the LRU now) |
| 8 F | miss | F | C | A | E | Place new reference to MRL after Move MRL to LRU,write back LRU if dirty, LRU*++(C is the LRU now) |
| 9 G | miss | G | F | A | E | Place new reference to MRL after Move MRL to LRU,write back LRU if dirty, LRU*++(A is the LRU now) |
| 10 E | hit to non-LRU | E | F | A | G | swap ref/MRU ; no change to LRU* |
| 11 H | miss | H | F | E | G | Place new reference to MRL after Move MRL to LRU,write back LRU if dirty, LRU*++ |
| 12 A | miss | A | F | E | H | Place new reference to MRL after Move MRL to LRU,write back LRU if dirty, LRU*++(F is the LRU ) |
| 13 I | miss | I | A | E | H | Place new reference to MRL after Move MRL to LRU,write back LRU if dirty, LRU*++(E is the LRU ) |
| 14 J | miss | J | A | I | H | Place new reference to MRL after Move MRL to LRU,write back LRU if dirty, LRU*++(D is the LRU ) |
| 15 H | hit to LRU(=LRU) | H | A | I | J | swap ref/MRU ; LRU*++ |
| 16 I | hit to non-LRU | I | A | H | J | swap ref/MRU ; no change to LRU* |
| 17 B | miss | B | I | A | J | Place new reference to MRL after Move MRL to LRU,write back LRU if dirty, LRU*++(H is NOT the LRU,the LRU is J) |
| 18 I | hit to non-LRU | I | B | A | J | swap ref/MRU ; no change to LRU* , |
| 19 B | hit to non-LRU | B | I | A | J | swap ref/MRU ; no change to LRU* , |
| 20 H | hit to LRU(=LRU) | H | I | B | | swap ref/MRU ; LRU*++ |

HYBRID CACHE MEMORY AND METHOD FOR REDUCING LATENCY IN THE SAME

CROSS-REFERENCE TO RELATED APPLICATIONS

This application claims priority to U.S. Provisional Application No. 62/535,415, filed Jul. 21, 2017, entitled "Hybrid Cache Memory and Method for Reducing Latency in the Same," which is incorporated herein by reference in its entirety.

TECHNICAL FIELD

This relates to semiconductor memory devices and more particularly to hybrid cache memory devices and methods for reducing latency (e.g., average latency) in hybrid cache memory devices.

BACKGROUND

Modern processors generally employ main memory to be used in connection with a processor for program and data storage. To speed up the access of main memory, cache memory may be inserted between main memory and the processor to store frequently accessed data and codes. Cache memory generally operates faster than main memory so requests for data from cache memory are generally completed more quickly. Cache memory can be implemented using different types of semiconductor memory. Cache memory may be located close to or on the same chip as the associated processor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a table illustrating an example of the operation of a hybrid cache in accordance with some embodiments.

FIG. 4 is a table illustrating another example of the operation of a hybrid cache in accordance with some embodiments.

DETAILED DESCRIPTION

Figure 1:
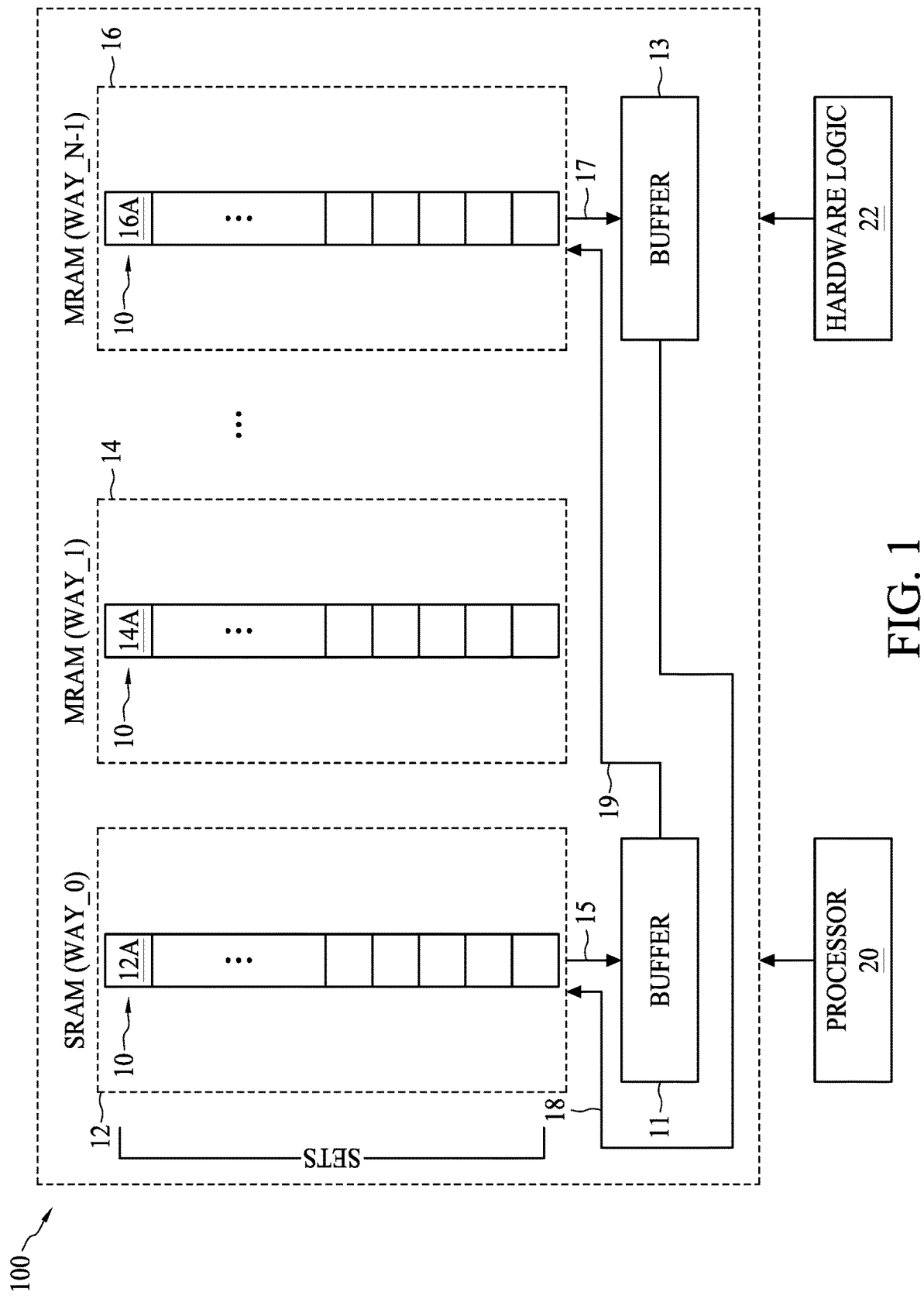
FIG. 1 is a schematic diagram illustrating an example of a hybrid cache memory in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Cache memory is a type of memory that is used in connection with processors (e.g., central processing units (CPU), accelerated processing units (APU), and/or graphics processing units (GPU)) to reduce memory access latency and to address bandwidth pressures associated with main memory. Cache memory generally comprises a data array and a tag array. The data array stores data for use by the processor and the tag array stores address and other status information (e.g., if the data has been changed or not) for the data stored in the data array. In some embodiments, the cache may also maintain replacement information to manage the cache during different operations (e.g., if a cache miss occurs and the relevant portion of cache is full). Cache may be located close to or on the same chip as the associated processor. Caches can be implemented using a variety of circuits based on various semiconductor technologies. For example, cache memory may be implemented using static random access memory (SRAM) circuits based on complementary metal oxide semiconductor (CMOS) technology. SRAM memory cells may consist of six transistors (e.g., a pair of cross-coupled inverters and two access devices). SRAM memory devices are relatively fast compared to alternative memory technologies and are therefore commonly used over alternative technologies. However, SRAM memory devices may be relatively large compared to alternative memory circuits and technologies and therefore, they occupy more space than possible alternative memory technologies.

In certain embodiments, it may be desirable to include a relatively large amount of cache in a processing system. If such a cache were composed of SRAM memory, that cache might occupy an unacceptable amount of space within the processing system. Accordingly, an alternative memory technology may be considered. The alternative memory technology may be one that has a smaller cell size than the SRAM memory cells, such as a magnetic random access memory (MRAM) or a spin-transfer torque MRAM (STT-MRAM). MRAM and STT-MRAM are generally smaller than SRAM but can be slower than SRAM. For example, an STT-MRAM cell may be structured to only include a single transistor and a magnetic tunnel junction (MTJ) instead of the six transistors that typically make up an SRAM call. MRAM is non-volatile and typically consumes less power in standby mode in comparison with SRAM. But, MRAM does have its disadvantages. For example, due to the relatively small resistivity difference between different logic states, it may be more difficult to sense the correct data value from an MRAM cell, resulting in a longer latency.

To mitigate the tradeoff between size and speed for cache design, a hybrid approach may be utilized in which a portion of the data array of the cache is implemented using one type of memory cell (e.g., faster SRAM cells) and another portion of the cache is implemented using another type of memory cell (e.g., smaller MRAM cells). By combining two different memory technologies, memory density and latency can both be improved.

To obtain acceptable average latency, in some embodiments, the hybrid cache may be designed such that the majority of accesses to the hybrid cache are to the portion of the hybrid cache implemented with the fast memory technology (e.g., SRAM).

In operation, most of the cache accesses are directed to the most recently used (MRU) data in the system. Accordingly, in some embodiments, the MRU data may be maintained in SRAM (e.g., always available for access in SRAM). This type of policy may involve swapping data between e.g., SRAM and MRAM during operation so that the most recently used data is stored in the faster SRAM portion.

FIG. 1 is a schematic diagram illustrating an example of a hybrid cache memory in accordance with some embodiments. FIG. 1 illustrates a cache 100 which includes a plurality of cache sets, including cache set 10. Although multiple cache sets are illustrated, for the purposes of illustration, only one cache set 10 will be discussed with reference to the embodiment illustrated in FIG. 1. The cache set may include a plurality of ways 12, 14, 16 and each way 12, 14, 16 may include a corresponding block of data 12A, 14A, 16A. As illustrated, the plurality of ways (n) may be identified as way_0, way_1 . . . way_n−1. Each block 12A, 14A, 16A may include a plurality of memory cells for storing data.

The cache 100 may also be in communication with a processor 20 configured to communicate with the cache 100 and hardware logic 22 configured to control the operation of the cache 100. In particular, as described herein, requests for data may be made from the processor 20 and the movement of data within the cache may be controlled by the hardware logic 22.

As illustrated in FIG. 1, the cache set 10 includes one SRAM way 12 and a plurality of MRAM ways (way_1-Way_N−1) 14, 16. SRAM way 12 includes block 12A. MRAM way 14 includes block 14A. MRAM way 16 includes block 16A. In operation data in individual memory cells within a block 14A, 16A can be addressed and accessed individually. However, data may be copied or moved by block to take advantage of spatial locality.

As discussed above, in operation, most of the cache accesses are directed to the most recently used (MRU) data in the system. However, to take further advantage of the hybrid cache 100 and further reduce average latency, it may be desirable to increase the number of cache accesses directed to the faster portion of the cache—the SRAM 12. Accordingly, in some embodiments, the MRU data may be maintained in SRAM (e.g., always available for access in SRAM). As illustrated in FIG. 1, the MRU portion of the cache 100 is block 12A within the SRAM way 12. Accordingly, to increase the number of cache accesses to the SRAM 12, the policy may involve swapping data between e.g., an SRAM portion of the cache 12 and an MRAM portion of the cache 14, 16 during operation. By implementing a policy where the MRU block 12A of data is moved to SRAM, the average latency of the cache 100 can be reduced. To achieve this, data may be read from the SRAM portion of memory 12 into a buffer 11 via operation 15 and from the MRAM portion of memory 14, 16 into buffer 13 via operation 17. Then via operations 18 and 19 the data locations can be switched or altered.

In some embodiments, in operation, there are five possible scenarios when an access for data is issued by a processor, (e.g., processor 20:

The requested data is already in the MRU portion (e.g., block 12A) of the SRAM way 12;
The requested data is not located in the hybrid cache 100 and there are empty blocks (e.g., 12A, 14A, and/or 16A in the cache sets 10;
The requested data is not located in the hybrid cache 100 and all of the blocks 12A, 14A, 16A in the cache set 10 are filled with data;
The requested data is in the least recently used (LRU) portion of the cache 100; or
The requested data is in the cache 100 and is not located in the MRU portion 12A or the LRU portion of the cache 100.

In some embodiments, each of these five scenarios may be addressed with a corresponding procedure.

If the requested data is already in the MRU portion (e.g., block 12A) of the SRAM 12, the procedure accesses the data from the MRU portion of the cache 100 and does not move any data between different portions of the cache 100 or other non-cache memory. In some embodiments, this procedure may be executed in about 80% of the data access requests.

If the requested data is not located in the hybrid cache 100 and there are empty blocks 12A, 14A, 16A in the cache set 10, the procedure may proceed in one of two ways. If the MRU block 12A is empty, the data is loaded into the MRU block 12A. Additionally, the pointer identifying the LRU block (e.g., 16A) remains unchanged. However, if the MRU block 12A already contains data, the existing data is moved to buffer 11 and then to the current LRU block (e.g., 16A) and the pointer for the LRU block is updated (e.g., incremented) such that it points to a new block of data. The MRU block 12A is then updated with the requested data.

If the requested data is not located in the hybrid cache 100 and all of the blocks 12A, 14A, 16A in the cache set 10 are filled with data, the procedure proceeds by writing any data in LRU block back to a non-volatile main memory (e.g., if there are changes) and moving the existing data in the MRU block 12A to the current LRU block. The pointer for the LRU block is updated (e.g., incremented) such that it points to a new block of data and the MRU block 12A is then updated with the requested data.

If the requested data is in the LRU portion of the cache 100, the procedure proceeds by swapping the data in the existing MRU block 12A with the data in the current LRU block and then updating (e.g., incrementing) the pointer corresponding to the LRU block.

If the requested data is in the cache 100 and not located in the MRU portion or the LRU portion of the cache 100, the procedure proceeds by swapping the data in the MRU block 12A with the requested data in the non MRU, non LRU block. In this situation, the pointer for the LRU block is not updated.

Figure 2:
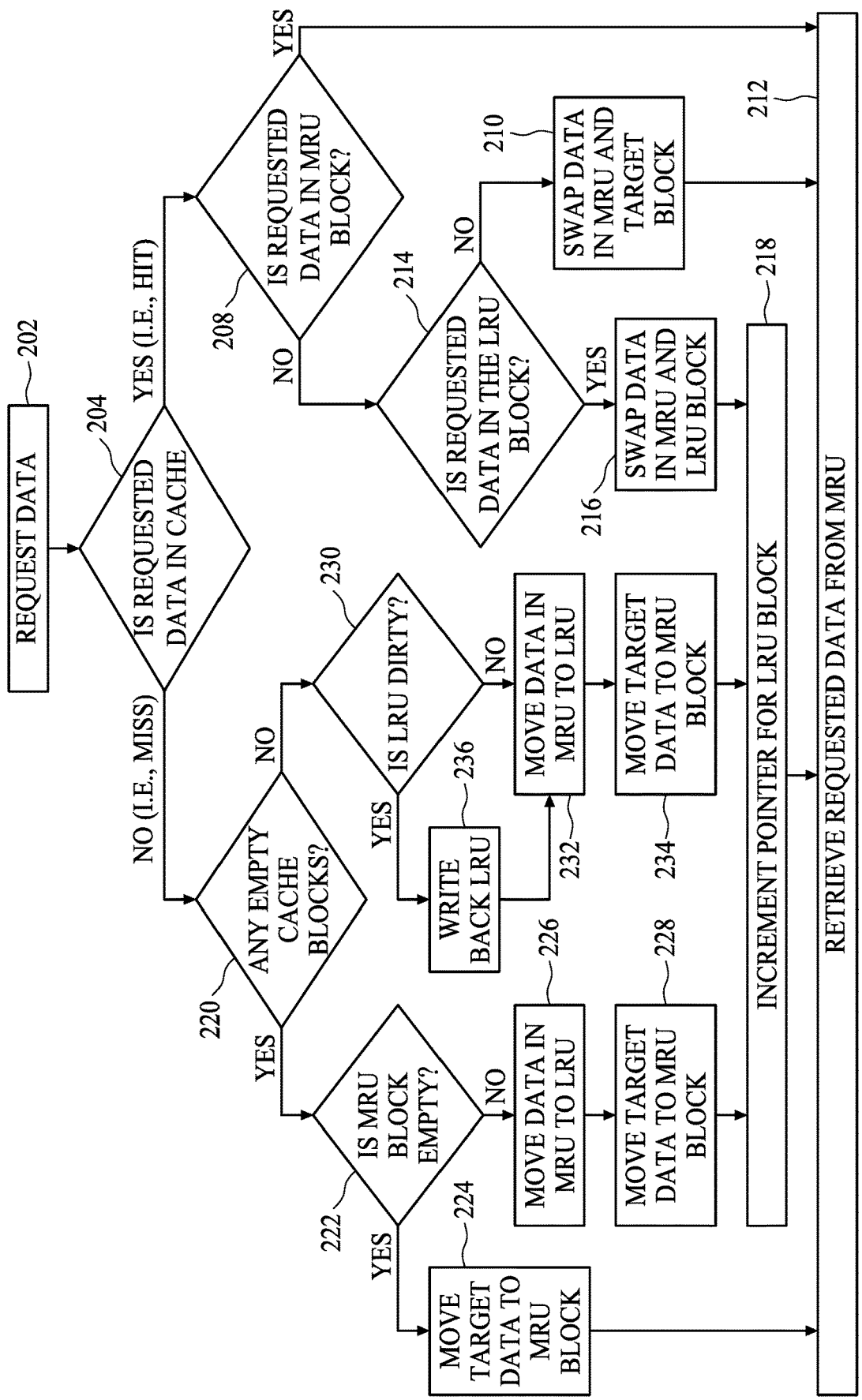
FIG. 2 is a flow chart illustrating the operation of a hybrid cache in accordance with some embodiments.

FIG. 2 is a flow chart illustrating the operation of a hybrid cache in accordance with some embodiments. The embodiment in FIG. 2 is merely an example of the operation of the hybrid cache. In some embodiments, the operation may be implemented in hardware via e.g., a finite state machine. While this embodiment addresses all five operating scenarios discussed above, other embodiments, may achieve similar results in different manners (e.g., by reordering the steps of the illustrated process) or by selecting an entirely different process. The example of FIG. 2 is not limited to any specific hardware implementation and is applicable to many hardware arrangements. The example is described below while referencing the hardware example of FIG. 1 for ease of visualization. Additionally, in some embodiments, the operations described herein may be skipped, additional operations may be added and/or the order of operations may be changed.

Initially, in operation 202, the system (e.g., the system illustrated in FIG. 1) requests data. In operation 204, the system determines whether the requested data is present in the cache 100. If the data is in the cache 100, the process continues with operation 208 where the system determines whether the requested data is in the MRU block (e.g., 12A).

If the data is present in the MRU block 12A, the system retrieves the requested data from the MRU block 12A in operation 212.

If the requested data is not in the MRU block 12A, the system, in operation 214, determines whether the requested data is in the LRU block 16A. If the data is in the LRU block 16A, the system swaps the data in the MRU block and the LRU block in operation 216. Then the pointer for the LRU block is incremented in operation 218 and the data is retrieved from the MRU block 12A in operation 212.

If the requested data is not in the LRU block 16A, the requested data in the target block (i.e., the block where the data is located) is swapped with the data from the MRU block 12A in operation 210 and the target data is retrieved from the MRU block 12A in operation 212.

If operation 204 determines the requested data is not in the cache 100, the process continues with operation 220 where the system determines whether there are any empty cache blocks. If there are empty cache blocks, the system determines whether the MRU block 12A is empty. If the MRU block 12A is empty, the system moves the target data to the MRU block in operation 224 and then retrieves the requested data from the MRU block in operation 212. If the MRU block 12A is not empty, the system moves the data in the MRU block 12A to the LRU block 16A in operation 226 and then moves the target data to the MRU block in operation 228. In operation 218, the pointer for the LRU block is incremented and, in operation 212, the requested data is retrieved from the the MRU block 12A.

If the system determined there were no empty cache blocks in operation 220 then, in operation 230, the system determines whether the data in the LRU block 16A is dirty (i.e., whether it is changed relative to what is stored in the main memory of the system). If the LRU data is not dirty, the system continues to operation 232 whether the data in the MRU block 12A is moved to the LRU block 16A. If the LRU block was dirty, the LRU data is written back to the main memory in operation 236 before performing operation 232. Next, in operation 234, the target data is moved to the MRU block 12A and the pointer for the LRU block is incremented in operation 218. In operation 212, the requested data is retrieved from the MRU block 12A. As should be appreciated, the process for loading data into the cache may be handled in different manners. For example, the example discussed above with respect to FIG. 1 describes an alternative embodiment for loading data, not already in the cache 100, into the cache 100. While the embodiment in FIG. 2 is described with reference to blocks 12A and 16A, it should be readily understood that the process may be performed in connection with any combination of blocks (e.g., 12A and 14A).

FIG. 3 is a table illustrating an example of the operation of a hybrid cache in accordance with some embodiments. The embodiment illustrated in FIG. 3 is of an eight way (way_0, way_1, way_2, way_3, way_4, way_5, way_6, way_7) cache with a single cache set 10. Each row of the table indicates a data request by the system. The data request is for the data in the first column (Reference). The second column describes which of the five conditions the requests corresponds to (hit/miss). The next eight columns correspond to ways of data (e.g., way_0, way_1, . . . way_n−1). As illustrated, the first of the eight columns corresponds to the MRU (M) way_0 (or a block (e.g., 12A) within the way) and the remaining seven ways or blocks correspond to the remaining ways in the cache set 10 (way_1, way_2, way_3, way_4, way_5, way_6, way_7). The shaded cell (way_1 in the first row, way_2 in the second row, etc) in the diagram corresponds to the LRU (L) block and as can be readily seen, the location of the LRU changes as a function of the LRU pointer which may be updated based on certain requests (described in more detail below). The last column describes the changes that occur to the cache set 10 based on the data request.

In the first row of FIG. 3 (below the headings), a request for data A is made. Since the cache set (way_0, way_1, way_2, way_3, way_4, way_5, way_6, way_7) is empty, because this is the beginning of the process, data A is loaded into the MRU block from main memory. In the next row (2), a request for data B is made. As discussed above, in certain embodiments, it may be desirable to consistently retrieve the requested data from the MRU block. Since the MRU block (way_0) does not include data B, the data A in MRU block (way_0) is moved to the block currently identified as the LRU block (way_1) so the data B can be loaded into the MRU block (way_0). A new LRU block (way_2) is identified by incrementing an LRU block pointer to the next block (LRU++). In the next two rows (3, 4) the same operation performed in row 2 is performed but with respect to data C and D respectively. The operations in rows 1-4 are referred to a "miss with empty way" because the requested data is not in the MRU block (way_0) and there are empty ways in the cache to load new data. In the fifth row (5), a request for data C is made. Since data C is not in the MRU block (way_0), but it is located in a non-LRU block (way_1) within the cache, this operation is referred to as a "hit to non-LRU). The data C in the non-LRU block (way_3) is swapped with the data D in the MRU block(way_0). Since the operation does not involve the LRU block (way_4), the LRU block pointer remains unchanged. The operation in row six (6) is similar to the operation in row five because the data A is in a non-LRU block. Accordingly, the data A in way_1) is swapped with data C In way_0. In rows seven, eight, and nine (7, 8, 9), a request for data (E, F, G) is made and the data is not in the cache (e.g., because it has not been used recently). This is similar to the data requests illustrated in rows 1, 2, 3, and 4. In this case, the data in the MRU block (way_0) is moved to the LRU block (way_4, way_5, way_6) and the LRU block pointer is incremented to the next block (way_5, way_6, way_7). Row ten (10) illustrates a similar operation to rows five and six discussed above in that the requested data is in a non-LRU block.

Row eleven (11) illustrates a similar operation to rows 1, 2, 3, 4, 7, 8, and 9 discussed above because the requested data H is not in the cache and there is still one empty way (way_7). Accordingly, data E from the MRU (way_0) is moved to the LRU block (way_7) and the LRU block pointer is incremented back to the first non-MRU block (way_1).

Beginning with row twelve (12) the cache set is full (i.e., there is data in all of the ways). In row twelve (12) a request for data A is made. Since data A is in a non-LRU block of the cache, the data in the MRU block (way_0) is swapped with data A in way_4. It is also worth noting that even though the LRU block pointer is pointing to the block way_1, the actual LRU data is in hightlighted block way_2. However, the process cannot determine that this is the case and so it continues to treat the data in block way_1 as the LRU data.

In rows thirteen and fourteen (13, 14), a request for data I, J is made and the data does not exist in cache which is full. This is simply referred to as a "miss." In this instance, the data C, B in the LRU block are removed from the cache since it is considered the oldest data in the cache. Then the data A, I in the MRU block (way_0) is moved to the LRU block (way_1, way_2) and the LRU block pointer is incremented to point to the next block (way_2, way_3). Finally, the requested data I, J, is loaded into the MRU block (way_0).

In row fifteen (15), the requested data D is located in the LRU block. In this case, the requested data D in the LRU block (way_3) is swapped with the data J in the MRU block (way_0). The LRU block pointer is incremented to the next block (way_4).

Row sixteen (16) illustrates an operation that is similar to the operation in row twelve because the requested data is in a non-LRU block. As described above, the data A in the requested block (way_1) is swapped with the data D in the MRU block (way_0).

The operation in row seventeen (17) is similar to the operation in rows thirteen and fourteen. In this instance, the data H in the LRU block is removed from the cache since it is considered the oldest data in the cache. Then the data A in the MRU block (way_0) is moved to the LRU block (way_4) and the LRU block pointer is incremented to point to the next block (way_5). Finally, the requested data B is loaded into the MRU block (way_0).

Rows eighteen and nineteen (18, 19) illustrate an operation that is similar to the operation in row twelve because the requested data is in a non-LRU block. As described above, the data I, A in the requested block (way_2, way_4) is swapped with the data B, I in the MRU block (way_0).

The operation in row twenty is similar to the operation in row fifteen. The requested data G in the LRU block (way_5) is swapped with the data A in the MRU block (way_0). The LRU block pointer is incremented to the next block (way_6).

FIG. 4 is a table illustrating another example of the operation of a hybrid cache in accordance with some embodiments. The embodiment illustrated in FIG. 4 is of a four way (way_0, way_1, way_2, way_3) cache set. As in FIG. 3, in FIG. 4, each row indicates a data request by the system. The data request is for the data in the first column (Reference). The second column (hit/miss) describes which of the five conditions the requests corresponds to. The next four columns (way_0, way_1, way_2, way_3) correspond to ways or blocks of data. As illustrated, the first of the four columns corresponds to the MRU (M) way or block and the remaining three blocks correspond to the remaining blocks in the cache set 10. The shaded cell in the diagram (way_1 in the first row, way_2 in the second row, etc) corresponds to the LRU block and as can be readily seen, the location of the LRU changes when the pointer is updated. The last column (notes) describes the changes that occur to the cache set 10 based on the data request.

The operation illustrated in FIG. 4 is similar to the operation illustrated in FIG. 3. In row one (1) of FIG. 4, the cache is empty. Accordingly, when a request for data A is made, data A is loaded into the MRU block (way_0). In row 2, a request for data B is made. Since data B is not in the cache, data A is moved to the LRU block (way_1) and the LRU block pointer is incremented to way_2. Then data B is loaded to the MRU block (way_0). In row 3, a request for data C is made. Since data C is not in the cache, data B is moved to the LRU block (way_2) and the LRU block pointer is incremented to way_3. Then data C is loaded to the MRU block (way_0). In row 4, a request for data D is made. Since data D is not in the cache, data C is moved to the LRU block (way_3) and the LRU block pointer is incremented to way_1. Then data D is loaded to the MRU block (way_0). After the request in row 4, the cache is full of data. In row 5, a request for data C is made. Since data C is in the cache and in a non-LRU block (way_3), the data in way_3 is swapped with the data in the MRU block (way_0). In row 6, a request for data A is made. Since data A is in the cache and in the LRU block (way_1), the data in way_1 is swapped with the data in the MRU block (way_0) and the LRU block pointer is incremented to way_2.

In row 7, a request for data E is made. Since data E is not in the cache, data A is moved to the LRU block (way_2) and the LRU block pointer is incremented to way_3. Then data E is loaded to the MRU block (way_0). In row 8, a request for data F is made. Since data F is not in the cache, data E is moved to the LRU block (way_3) and the LRU block pointer is incremented to way_1. Then data F is loaded to the MRU block (way_0). In row 9, a request for data G is made. Since data G is not in the cache, data F is moved to the LRU block (way_1) and the LRU block pointer is incremented to way_2. Then data E is loaded to the MRU block (way_0).

In row 10, a request for data E is made. Since data E is in the cache and in a non-LRU block (way_3) (similar to the situation in row 5), the data in way_3 is swapped with the data in the MRU block (way_0).

In row 11, a request for data H is made. Since data H is not in the cache, data E is moved to the LRU block (way_2) and the LRU block pointer is incremented to way_3. Then data H is loaded to the MRU block (way_0). In row 12, a request for data A is made. Since data A is not in the cache, data H is moved to the LRU block (way_3) and the LRU block pointer is incremented to way_1. Then data A is loaded to the MRU block (way_0). In row 13, a request for data I is made. Since data I is not in the cache, data A is moved to the LRU block (way_1) and the LRU block pointer is incremented to way_2. Then data I is loaded to the MRU block (way_0). In row 14, a request for data J is made. Since data J is not in the cache, data I is moved to the LRU block (way_2) and the LRU block pointer is incremented to way_3. Then data J is loaded to the MRU block (way_0).

In row 15, a request for data H is made. Since data H is in the cache and in the LRU block (way_3), the data in way_3 is swapped with the data in the MRU block (way_0) and the LRU block pointer is incremented to way_1. In row 16, a request for data I is made. Since data I is in the cache and in a non-LRU block (way_2) (similar to the situation in row 5), the data in way_2 is swapped with the data in the MRU block (way_0).

In row 17, a request for data B is made. Since data B is not in the cache, data I is moved to the LRU block (way_1) and the LRU block pointer is incremented to way_2. Then data B is loaded to the MRU block (way_0). In row 18, a request for data I is made. Since data I is in the cache and in a non-LRU block (way_1), the data in way_1 is swapped with the data in the MRU block (way_0). In row 19, a request for data B is made. Since data B is in the cache and in a non-LRU block (way_1), the data in way_1 is swapped with the data in the MRU block (way_0). In row 20, a request for data H is made. Since data H is in the cache and in the LRU block (way_2), the data in way_2 is swapped with the data in the MRU block (way_0) and the LRU block pointer is incremented to way_3.

As discussed above and illustrated in FIG. 4, these various situations cause the cache to operate in a particular fashion as described in the "notes" column of FIG. 4 and more generally with respect to FIG. 2.

Some embodiments described herein may include a method for controlling a cache comprising receiving a request for data and determining whether the requested data is present in a first portion of the cache, a second portion of the cache, or not in the cache. If the requested data is not located in the first portion of the cache, the requested data is moved into the first portion of the cache.

Some embodiments described herein may include a hardware implemented finite state machine comprising: a digital logic circuit, which, when operating, causes the hardware implemented finite state machine to perform logical operations. The operations include receiving a request for data; determining whether the requested data is present in a most recently used (MRU) portion of a cache. If the requested data is not located in the MRU portion of the cache, data is swapped between the MRU portion of the cache and a portion of the cache where the requested data is located.

Some embodiments described herein may include a semiconductor memory device comprising a processor and a first portion of cache comprising at least one block of data storage and implemented using static random access memory (SRAM). The semiconductor memory device further comprises a second portion of cache comprising a plurality of blocks of data storage and implemented using magnetic random access memory (MRAM). A most recently used (MRU) portion of the cache located is within the first portion of cache, and the semiconductor memory device includes hardware implemented logic configured to receive a request for data from the processor and move data to the MRU portion of the cache if the requested data is not located in the MRU portion of the cache.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method for controlling a cache comprising:
   receiving a request for data;
   determining whether the requested data is present in a most recently used (MRU) portion of the cache, a least recently used (LRU) portion of the cache, a remaining portion of the cache that is not the MRU portion of the cache or the LRU portion of the cache, or not in the cache; and
   identifying, using a pointer, the LRU portion of the cache as the next location to store new data, regardless of whether the LRU portion actually stores the least recently used data;
   wherein if the requested data is present in the cache:
      accessing the first portion of the cache, without incrementing the pointer, if the requested data is present in the MRU portion of the cache;
      swapping data between the MRU portion of the cache and the LRU portion of the cache, and incrementing the pointer, if the requested data is present in the LRU portion of the cache;
      swapping data between the MRU portion of the cache and the location in the remaining portion of the cache which contains the requested data, without incrementing the pointer, if the requested data is present in the remaining portion of the cache;
   wherein if the requested data is not present in the cache:
      writing the requested data into the MRU portion of the cache, and
      incrementing the pointer, if the MRU portion of the cache is empty;
      swapping data between the MRU portion of the cache and the LRU portion of the cache, writing the requested data into the MRU portion of the cache, and incrementing the pointer, if the MRU portion of the cache is not empty.

2. The method of claim 1, wherein the cache is collocated with a processor on a single chip package.

3. The method of claim 2, wherein the MRU portion of cache comprises at least one block of data storage implemented using static access memory (SRAM) and the LRU portion of cache comprises a plurality of blocks of data storage implemented using a second technology with a smaller cell size than SRAM.

4. The method of claim 3, wherein the MRU portion of the cache corresponds to a block in the SRAM portion of the cache where the requested data is moved to.

5. The method of claim 1, wherein the MRU portion of the cache has a smaller access latency than the LRU portion of the cache.

6. The method of claim 1, wherein the MRU portion of the cache has a smaller cell size than cells in the LRU portion of the cache.

7. The method of claim 1, wherein the LRU portion of the cache is a spin transfer torque magnetic random access memory (STT-MRAM).

8. The method of claim 1, wherein the method is implemented in hardware via a finite state machine.

9. A hardware implemented finite state machine comprising: a digital logic circuit, which, when operating, causes the hardware implemented finite state machine to perform operations comprising:
   receiving a request for data;
   determining whether the requested data is present in (1) a most recently used (MRU) portion of a cache, (2) a least recently used (LRU) portion of the cache, (3) a portion of the cache that is not the MRU portion of the cache or the LRU portion of the cache, (4) or not in the cache; and
   identifying, using a pointer, the LRU portion of the cache as the next location to store new data, regardless of whether the LRU portion actually stores the least recently used data;
   wherein if the requested data is present in the cache:
      accessing the first portion of the cache, without incrementing the pointer, if the requested data is present in the MRU portion of the cache;
      swapping data between the MRU portion of the cache and the LRU portion of the cache, and incrementing the pointer, if the requested data is present in the LRU portion of the cache;
      swapping data between the MRU portion of the cache and the location in the remaining portion of the cache which contains the requested data, without incrementing the pointer, if the requested data is present in the remaining portion of the cache;
   wherein if the requested data is not present in the cache:
      writing the requested data into the MRU portion of the cache, and
      incrementing the pointer, if the MRU portion of the cache is empty;
      swapping data between the MRU portion of the cache and the LRU portion of the cache, writing the requested data into the MRU portion of the cache, and incrementing the pointer, if the MRU portion of the cache is not empty.

10. The hardware implemented finite state machine of claim 9, wherein the cache is a hybrid cache comprising at least a first type of memory and a second type of memory, different from the first type of memory, and the MRU portion of the cache corresponds to the first type of memory.

11. The hardware implemented finite state machine of claim 10, wherein the first type of memory has a smaller access latency than the second type of memory.

12. The hardware implemented finite state machine of claim 10, wherein the first type of memory has a larger cell size than cells in the second type of memory.

13. The hardware implemented finite state machine of claim 10, wherein the first type of memory is static random access memory (SRAM).

14. The hardware implemented finite state machine of claim 10, wherein the second type of memory is a spin transfer torque magnetic random access memory (STT-MRAM).

15. A semiconductor memory device comprising:
   a processor;
   a most recently used (MRU) portion of a cache comprising at least one block of data storage and implemented using a first type of memory;
   a least recently used (LRU) portion of the cache comprising a plurality of blocks of data storage and implemented using a second type of memory different than the first type of memory;
   hardware implemented logic configured to receive a request for data from the processor, determine whether the requested data is present in (1) the MRU portion of the cache, (2) an LRU portion of the cache, (3) a portion of the cache that is not the MRU portion of the cache or the LRU portion of the cache, (4) or not in the cache;
   identifying, using a pointer, the LRU portion of the cache as the next location to store new data, regardless of whether the LRU portion actually stores the least recently used data not the portion of the cache where the actual least recently used data is located;
   wherein if the requested data is present in the cache:
      accessing the first portion of the cache, without incrementing the pointer, if the requested data is present in the MRU portion of the cache;
      swapping data between the MRU portion of the cache and the LRU portion of the cache, and incrementing the pointer, if the requested data is present in the LRU portion of the cache;
      swapping data between the MRU portion of the cache and the location in the remaining portion of the cache which contains the requested data, without incrementing the pointer, if the requested data is present in the remaining portion of the cache;
   wherein if the requested data is not present in the cache:
      writing the requested data into the MRU portion of the cache, and
   incrementing the pointer, if the MRU portion of the cache is empty;
      swapping data between the MRU portion of the cache and the LRU portion of the cache, writing the requested data into the MRU portion of the cache, and incrementing the pointer, if the MRU portion of the cache is not empty.

* * * * *